United States Patent [19]
Hirashima et al.

[11] Patent Number: 5,088,765
[45] Date of Patent: Feb. 18, 1992

[54] AIR BAG SYSTEM FOR VEHICLE

[75] Inventors: Isao Hirashima; Yasunori Iwamoto, both of Hiroshima, Japan

[73] Assignee: Mazda Motor Corporation, Hiroshima, Japan

[21] Appl. No.: 526,630

[22] Filed: May 22, 1990

[30] Foreign Application Priority Data

May 24, 1989 [JP] Japan .................. 1-129006

[51] Int. Cl.$^5$ ............................ B60R 21/22
[52] U.S. Cl. ...................... 280/732; 180/90
[58] Field of Search .......... 280/728, 730, 732, 743; 180/90

[56] References Cited

U.S. PATENT DOCUMENTS

| | | | |
|---|---|---|---|
| 3,930,664 | 1/1976 | Parr | 280/732 |
| 4,770,439 | 9/1988 | Maier | 280/732 |
| 4,911,471 | 3/1990 | Hirabayashi | 280/732 |

FOREIGN PATENT DOCUMENTS 60-234031 11/1985 Japan .................. 180/90
62-198547 9/1987 Japan .

Primary Examiner—Charles A. Marmor
Assistant Examiner—Karin Tyson
Attorney, Agent, or Firm—Fleit, Jacobson, Cohn, Price, Holman & Stern

[57] ABSTRACT

An air bag system includes an air bag unit having an air bag to be inflated, an inflator for generating a gas for the air bag and a casing for receiving the air bag in a folded state in a normal condition. An instrument panel provides a space in which the air bag unit is disposed, a dash upper panel is disposed in front of the air bag unit in a longitudinal direction of the vehicle, and a protective structure or device prevents the dash upper panel from interfering with a proper operation of the air bag unit. A proper operation of the air bag system can, therefore, be successfully maintained.

5 Claims, 5 Drawing Sheets

AIR BAG SYSTEM FOR VEHICLE

BACKGROUND OF THE INVENTION

1. Field of the Invention

This invention relates to an air bag system for a vehicle.

2. Description of the Related Art

Conventionally, there has been known an automobile equipped with an air bag system as a safety device for a passenger in which the passenger is prevented from being injured in case of a collision thereof. For example, Japanese Patent Public Disclosure No. 62-198547, laid open to the public in 1987, discloses an air bag system provided with an air bag and an unit including an air bag, inflater for generating gas by which the air bag is inflated. The air bag unit is disposed within a space defined by an instrument panel and rearward of a dash upper panel. In the air bag system, the inflater is actuated to produce the gas to develop and inflate the air bag in order to protect the head and the breast of the passenger when a collision occurs.

With this conventional air bag system, it should, however, be noted that when the dash upper panel is deformed and moved rearwardly, so as to interfere with the air bag unit when the collision occurs, the air bag system will not be able to operate properly.

In order to prevent this problem, it is proposed that the dash upper panel be diposed so as to be spaced from the air bag unit and not to interfere with the air bag in case of collision. However, this structure is disadvantageous in that a passenger compartment is reduced, resulting from providing enough space between the dash upper panel and the air bag system.

SUMMARY OF THE INVENTION

An object of the invention is, therefore, to provide an air bag system which has a reliable operation in protecting the passenger in case of collision.

Another object of the invention is to provide an air bag system in which a distance between the dash upper panel and the air bag unit can be restricted and made as small as possible.

Still another object of the invention is to provide an air bag system in which a spacious passenger compartment can be provided.

The above object of the invention can be accomplished by an air bag system comprising an air bag unit having together with an air bag to be inflated, an inflator for generating a gas for the air bag and a casing for receiving the air bag in a folded state and in a normal condition, a front member for providing a space in which the air bag unit is disposed, a dash upper panel disposed in front of the air bag unit in a longitudinal direction of a vehicle, and protective means for preventing the dash upper panel from interfering with a proper operation of the air bag unit.

As the protective means, for example, at least a part of the dash upper panel facing the air bag unit is smaller than the air bag unit in rigidity so that the dash upper panel can be deformed without damaging the air bag unit when the dash upper panel hits the air bag unit in case of collision.

In order to get the above effect, at least a part of the air bag unit with which the dash upper panel is brought into contact can be constituted by a member of a lower material or structural rigidity which is readily deformable without damaging the proper inflating operation of the air bag.

The protective means can be constituted in a manner that a bumping member is disposed between the dash upper panel and the air bag unit for bumping and reducing an impact force from the dash upper panel so as not to affect the proper operation of the air bag system.

Alternatively, a part of the dash upper panel facing the air bag system can be constituted to be moved to avoid an intereference with the air bag unit in case of the collision so that the impact of the collision is not transmitted to the air bag unit through the dash upper panel.

The above and other features of the present invention will be apparent from the detailed description of the preferred embodiment of the present invention, making reference to the accompanying drawings.

DESCRIPTION OF THE PREFERRED EMBODIMENT

Figure 1:
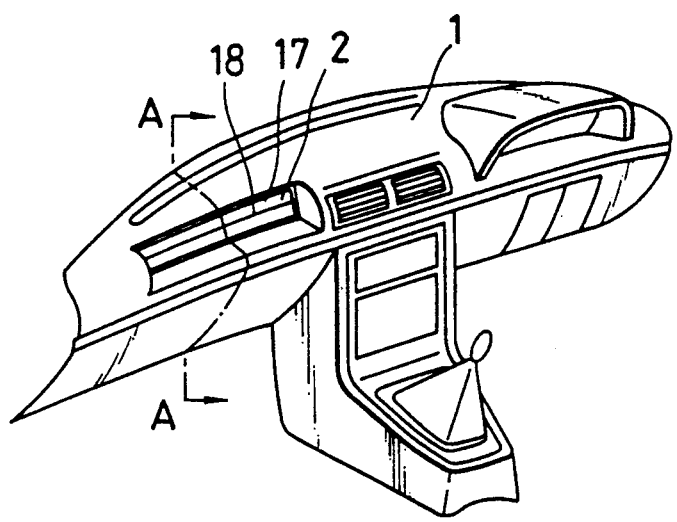
FIG. 1 is a perspective view of a front portion of a passenger compartment of a vehicle to which the present invention can be applied.

FIG. 1 is a perspective view showing a front inside view of an instrument panel 1 of a passenger compartment of a vehicle to which the present invention can be applied.

Figure 2:
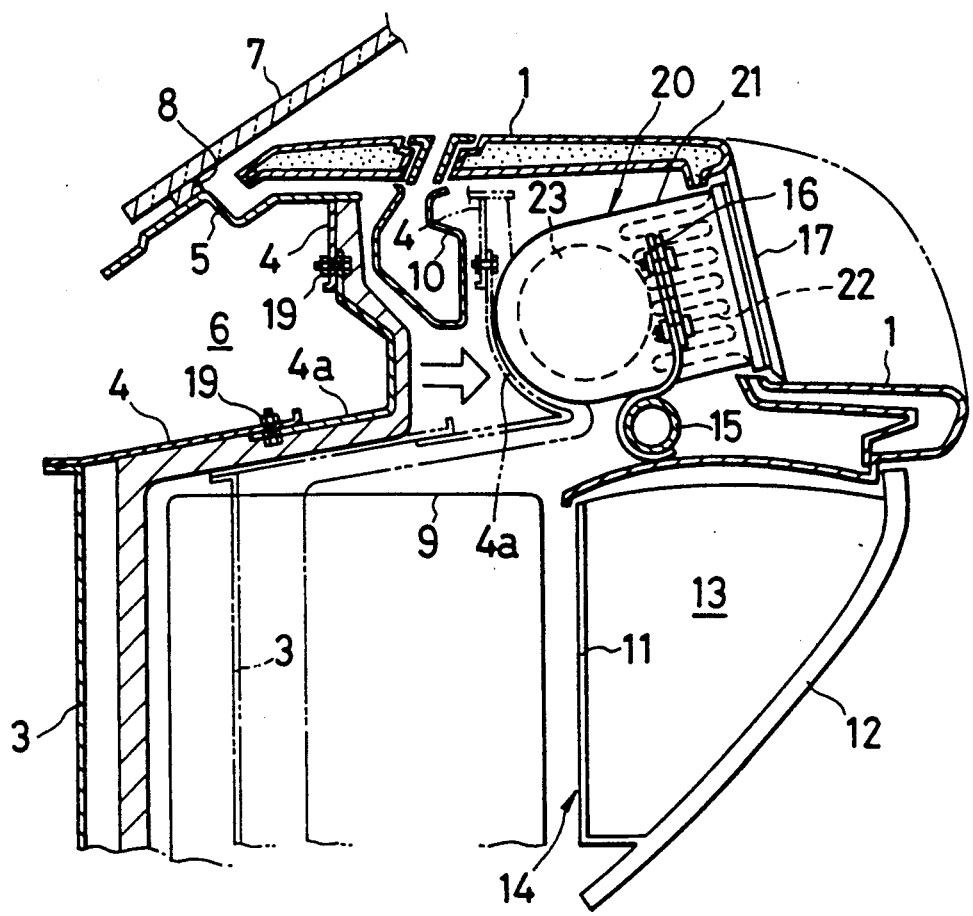
FIG. 2 is a sectional view taken along a line A—A in the FIG. 1.

FIG. 2 is a sectional view taken along a line A—A of FIG. 1.

The instrument panel 1 as a front member of the compartment is arranged to partly define a front portion of a passenger compartment of the vehicle. The instrument panel 1 is formed with an opening or space extending transversely of the vehicle. An air bag system 2 is incorporated in the front portion of the passenger compartment in the vicinity of an assistant driver's seat.

As shown in FIG. 2, a dash lower panel 3 of a metallic plate is disposed at a rear end of an engine room of the vehicle. A dash upper panel 4, mostly constituted by the metallic plate, is connected with an upper end of the dash lower panel 3. A cowl upper panel 5 is connected with an upper end of the dash upper panel 4 at a rear end thereof. A cowl front panel (not shown) is connected with both a front end of the cowl upper panel 5 and the dash upper panel 4 to define a cowl box 6 forming a closed cross sectioned structure extending transversely.

A front windshield glass 7 is secured to the cowl upper panel 5 by means of an adhesive 8.

A cooling unit 9 i.e., an air conditioner, is disposed rearward of the dash lower panel 3 and under the dash upper panel 4. Thus, the cooling unit 9 is located in a space defined by the instrument panel 1. A defroster nozzle 10 is disposed beneath a top deck of the instrument panel 1. The defroster nozzle 10 supplies air from the cooling unit toward the front windshield glass 7 so as to demist the glass 7

A glove compartment 14 is defined by a glove tray 11, a glove lid 12 and a glove pocket 13 rearward of the cooling unit 9.

A steering support member 15 is arranged rearward of and above the cooling unit 9. The steering support member 15 extends transversely and is connected with hinge pillars (not shown) at opposite ends thereof through brackets (not shown). Between a central portion of the steering support member 15 and a floor tunnel portion is a reinforcement, extending in an up and down direction, to constitute a T-shaped steering support structure.

To the steering support member 15 is fixed a bracket 16 on which an air bag unit 20 of the air bag system 2 is mounted.

As shown in FIG. 2, the air bag unit 20 is provided with a casing 21, an air bag 22 stored in the casing 21 in a folded condition, a gas inflater 23 and the like.

When a collision occurs in the vehicle, a collision sensor (not shown) detects the collision. Then, an igniter is caused to ignite a chemical composition in the inflater 23, by which a gas is produced so that the air bag is inflated. Thus, the passenger is prevented from being injured, since his head and chest hit the inflated air bag.

There is provided a lid 17 just rearward Of the air bag unit 20. The lid 17 is constituted as an extension of the instrument panel 1. The lid 17 is formed with a breakable weakened line 18 extending transversely at which the lid 17 is broken to be opened like a double door for thereby facilitating the inflation of the air bag 22.

Figure 3:
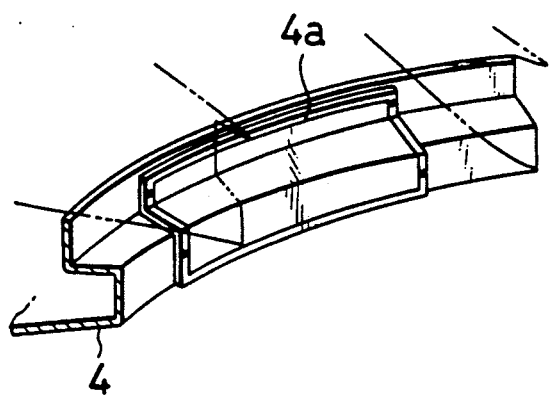
FIG. 3 is a perspective view of a rear portion of a dash upper panel.

As shown in FIG. 3, the dash upper panel 4 is provided with a lower rigidity panel 4a facing to the air bag unit 20. The lower rigidity portion 4a is made of a synthetic resin, aluminum plate or the like which is lower than the casing 21 of the air bag unit 20. The lower rigidity plate is mounted on the dash upper panel 4 through fasteners 19, such as bolts and nuts.

With this structure, when the collision occurs, the dash lower panel 3 and the dash upper panel 4 move rearwardly in a longitudinal direction of the vehicle as shown by an arrow in FIG. 2 so that the lower rigidity plate 4a of the dash upper panel 4 is brought into contact with the air bag unit 20. It should be noted that the lower rigidity panel 4a is deformed as shown by a phantom line in FIG. 2 to form protective means so that the air bag unit 20 is not affected by the rearward movement of the dash upper panel 4.

Figure 4:
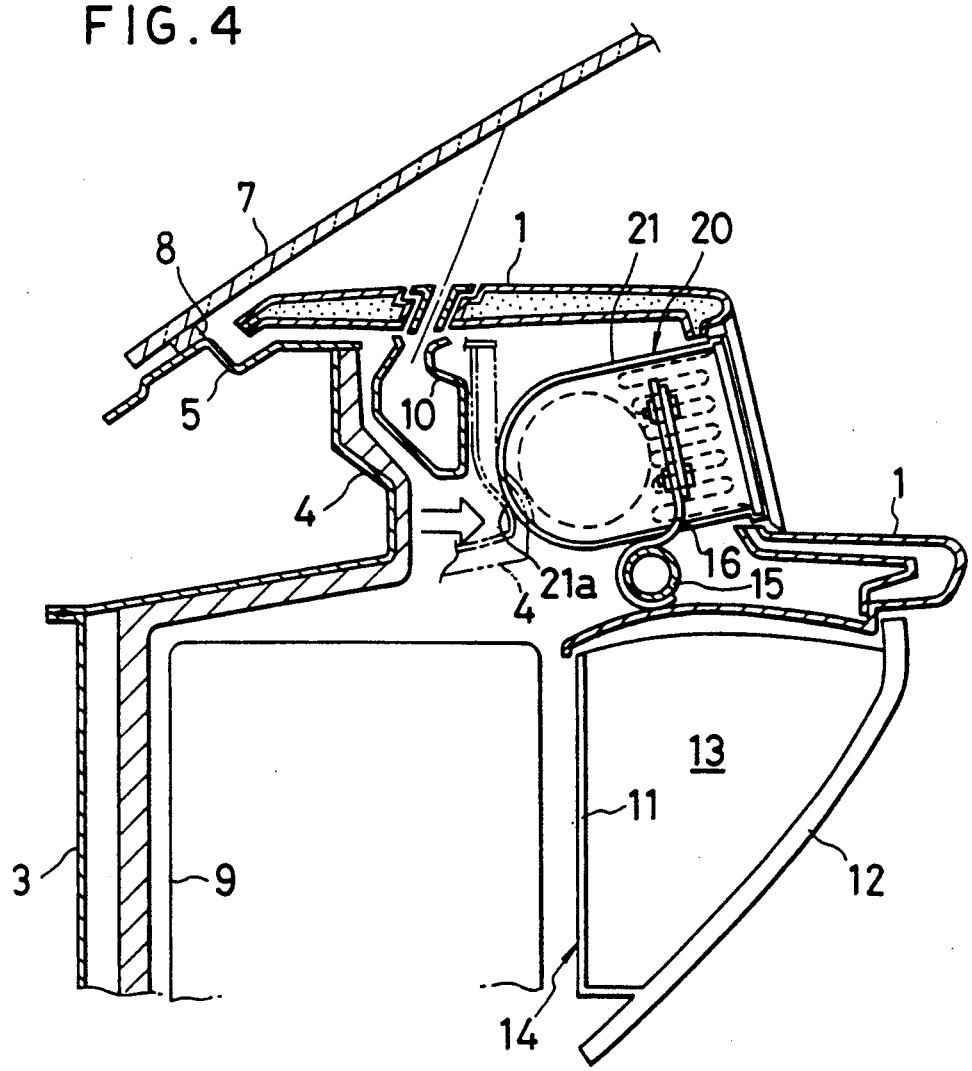
FIG. 4 is a sectional view similar to FIG. 2 but showing another embodiment.
Figure 5:
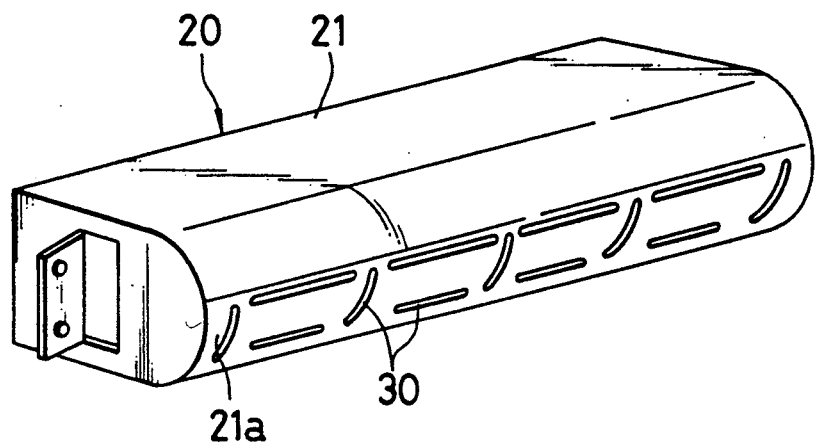
FIG. 5 is a perspective view of a front portion of a casing of an air bag unit according to the embodiment of the present invention shown in FIG. 4; still further embodiment.

Hereinafter, there is described another embodiment of the present invention, making reference to FIGS. 4 and 5. The same elements as in the former embodiment are referred to by the same numerals and a detailed explanation thereof will be omitted.

In this embodiment, the casing 21 of the air bag unit 22 is partly lowered in rigidity as compared with the dash upper panel 4. For this purpose, the casing 21 is formed with plural recesses 30 at a portion 21a as shown in FIG. 5 facing the dash upper panel 4 for lowering the rigidity thereof. The rigidity of the casing 21 can be lowered by reducing the thickness of the portion 21a or by forming it of a lower rigidity material.

In operation, when the collision occurs, the dash lower panel 3 and the dash upper panel 4 move rearwardly so that the dash upper panel 4 is brought into contact with the portion 21a of the casing 21. It should be noted that the portion 21a of the casing is lowered in rigidity compared with the dash upper panel 4. Thus, the casing 21 is deformed at the portion 21a, so as to form protective means, without changing the attitude thereof and while maintaining a proper operation.

Figure 6:
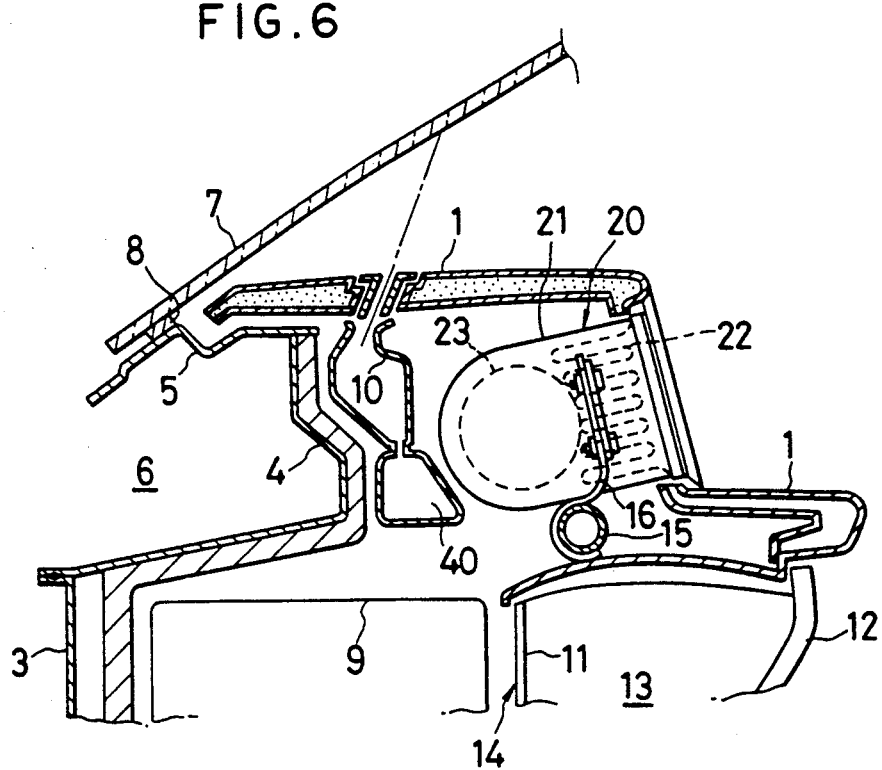

Referring to FIG. 6, a still further embodiment is illustrated. In this embodiment, there is provided a bumping member 40 between the dash upper panel 4 and the air bag unit 20. The bumping member 40 is integrally formed with the defroster nozzle 10 as an extension thereof. The bumping member can be constituted by, for example, rubber reinforced by a steel plate.

In operation, although the dash upper panel 4 is moved rearwardly in the case of a collision to deform the bumping member 40 bumping member forms a protective means, and the air bag unit 20 is not affected seriously by the collision.

Figure 7:
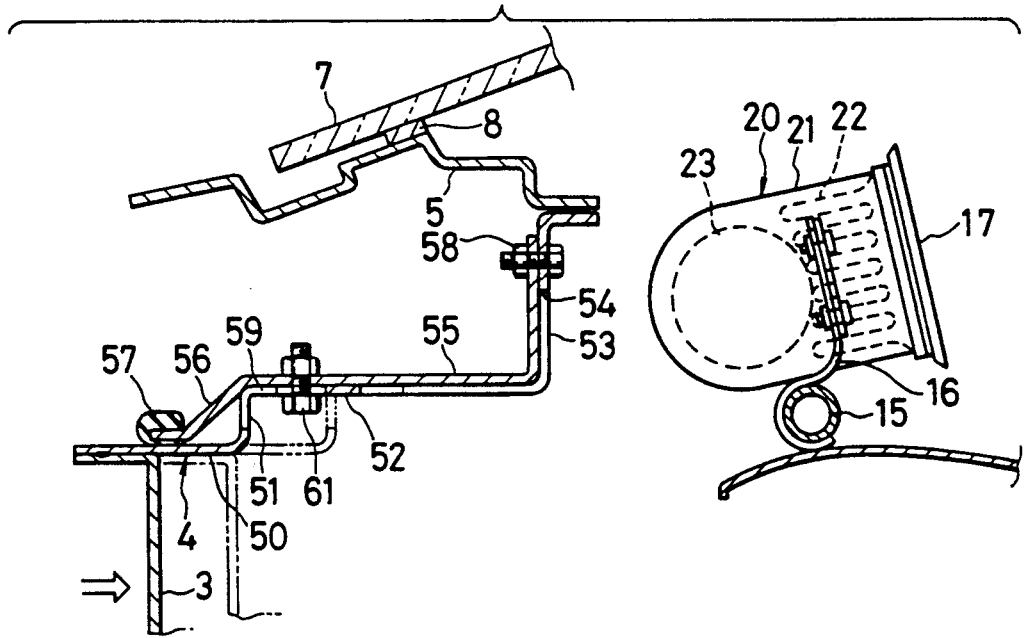
FIG. 7 is a sectional view similar to FIG. 6 but showing yet another embodiment.
Figure 8:
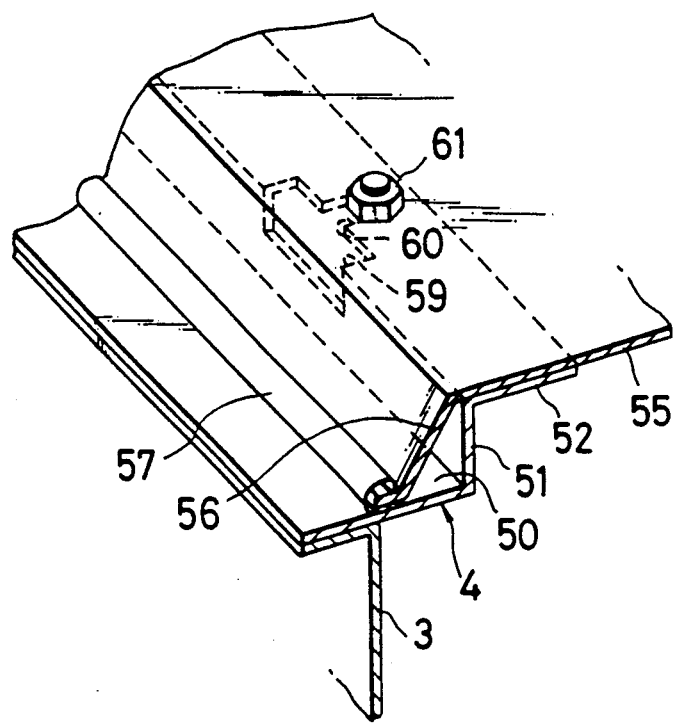
FIG. 8 is a perspective view of a seal panel and a dash upper panel.
Figure 9:
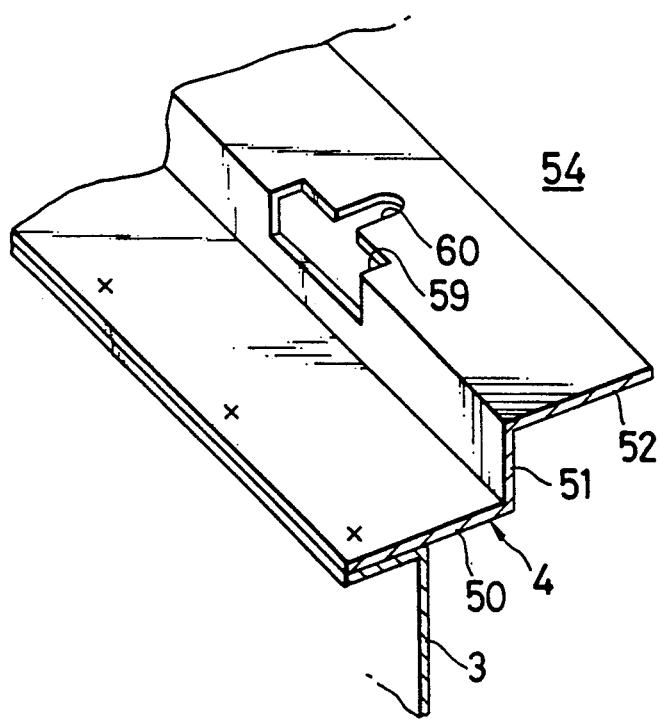
FIG. 9 is a perspective view of the dash upper panel and a dash lower panel.

Referring to FIGS. 7, 8 and 9, there is illustrated a yet further embodiment of the present invention.

In this embodiment, the dash upper panel 4 can make a different movement from the other portion constituting a body member so as not to interfere with the air bag unit 20.

The dash upper panel 4 is provided with a first portion 50 extending horizontally rearwardly from a joint portion with the dash lower panel 3, a second portion 51 extending upwardly from a rear end of the first portion 50, a third portion 52 extending horizontally rearwardly from the upper end of the second portion 51 and a fourth portion 53 extending upwardly from a rear end of the third portion 52 and connected with the cowl upper panel 5. The dash upper panel 4 is formed with a rectangular opening 54 across the third portion 52 and the fourth portion 53. The dash upper panel 4 is finally connected with a rear end of the cowl upper panel 5 at a rear end portion extending horizontally rearwardly from an upper end of the fourth portion 53.

A seal panel 55 is brought into engagement with the dash upper panel 4 so as to cover the opening 54. The seal panel 55 is formed with a front extension 56 extending forwardly and downwardly. A sealing material is applied to a front end of the front extension 56 of the seal panel for sealing. The seal panel 55 is formed with a vertical portion extending upwardly from a rear end of a horizontal portion thereof. An upper end portion of the vertical portion of the seal panel 55 is connected with a upper portion of the fourth portion 53 of the dash upper panel 4 above the opening 54.

As shown in FIG. 9, the dash upper panel 4 is formed with an opening 59. The opening 59 is extended in the longitudinal direction of the vehicle to form an extension 60. The seal panel 55 is formed with a round opening through which a fastener 61 such as bolt nut member is extended. The fastener 61 is applied into the opening of the seal panel 55 and engaged with the dash upper panel through the extension 60 so that the dash upper panel 4 is secured to the seal panel 55 by means of the fastener. The opening 59 is big enough not to interfere with a head Of the fastener 61 in depth or length on the second portion 51. In operation, the dash upper panel 4 is moved rearwardly in case of the collision. In this case, the seal panel 55 is fixed to the upper portion of the fourth portion 53 of the dash upper panel 4 at the rear and upper end while the seal panel 55 has a free end at the front end, although the sealing material 57 is applied to the front end thereof. Thus, the seal panel 55 can move forwardly relative to the second portion 51 together with the fastener 61, and is disengaged from the second portion 51. The opening 54 in the dash upper panel 4 faces the air bag unit 20 and the seal panel 55 covering the opening 54, which thus serves as a part of the dash upper panel 4, is moved forwardly relative to the air bag unit 20 in case of the collision. Since dash panel 4 includes opening 59, extension 60 and opening 54, which form protective means, the air bag unit 20 is not affected by the collision.

It will be apparent that various modifications and improvement can be made based on the above description by those skilled in the art without departing from the spirit of the present invention. All of such modifications are intended to be included in the scope of the present invention as claimed.

What is claimed is:

1. An air bag system for a vehicle comprising:
   an air bag unit, having an air bag to be inflated, an inflator for generating a gas to inflate the air bag, and a casing for receiving the air bag when the air bag is in a folded state and in a normal condition,
   an instrument panel providing a space in which the air bag unit is disposed,
   a defroster nozzle disposed below a top portion of said instrument panel for supplying air to defrost windshield glass of the vehicle.
   a dash upper panel disposed in front of the air bag unit in a longitudinal direction of the vehicle, and
   a bumping member for preventing the dash upper panel from damaging the air bag unit and interfering with a proper operation of the air bag unit, said bumping member being an extension of said defroster nozzle and disposed between said dash upper panel and said casing so as to be deformed by said dash upper panel and said casing when said dash upper panel is moved into contact with said bumping member during the collision, the air bag unit thereby being unaffected by movement of said dash upper panel during said collision.

2. An air bag system for a vehicle comprising:
   an air bag unit, having an air bag to be inflated, an inflator for generating a gas to inflate the air bag and a casing for receiving the air bag when the air bag is in a folded state and in a normal condition,
   an instrument panel providing a space in which the air bag unit is disposed, and
   a dash upper panel disposed in front of the air bag unit in a longitudinal direction of the vehicle, the dash upper panel including protective means permitting the dash panel to move in the longitudinal direction so as to prevent the dash upper panel from damaging the air bag unit and interfering with a proper operation of the air bag unit, said protective means being formed by openings in a part of the dash upper panel, which faces the air bag unit, said openings permitting said part of the dash upper panel to be moved to avoid an interference with the air bag unit during a collision so that an impact of the collision is not seriously transmitted to the air bag unit.

3. An air bag system as recited in claim 2, wherein the dash upper panel is formed with an opening facing the air bag unit, the opening being covered by a panel member which is secured to the dash upper panel, the panel member being moved forwardly relative to the air bag unit so as not to interfere with the air bag unit during the collision.

4. An air bag system for a vehicle comprising:
   an air bag unit, having an air bag to be inflated, an inflator for generating a gas to inflate the air bag and a casing for receiving the air bag when the air bag is in a folded state and in a normal condition,
   an instrument panel providing a space in which the air bag unit is disposed, and
   a dash upper panel disposed in front of the air bag unit in a longitudinal direction of the vehicle, the dash upper panel moving in a longitudinal direction during a collision and including protective means provided thereon for preventing the dash upper panel from damaging the air bag unit and interfering with a proper operation of the air bag unit, said protective means being at least partially formed by a plate mounted on said dash upper panel and having a rigidity lower than rigidities of said dash upper panel and of said casing so that when the collision occurs, the plate is brought into contact with the casing and is deformed, the air bag unit thereby being unaffected by movement of said dash upper panel during said collision.

5. An air bag system for a vehicle comprising:
   an air bag unit, having an air bag to be inflated, an inflator for generating a gas to inflate the air bag, and a casing for receiving the air bag when the air bag is in a folded state and in a normal condition, said casing being formed of first and second portions, the first portion of said casing having a rigidity which is lower than a rigidity of the second portion of said casing,
   an instrument panel providing a space in which the air bag unit is disposed,
   a dash upper panel disposed in front of the air bag unit in a longitudinal direction of the vehicle, said first portion of said casing facing said dash upper panel, the rigidity of said first portion of said casing being lower than a rigidity of said dash upper panel so that said first portion of said casing forms protective means, which deforms when the vehicle is subjected to a collision, for preventing the dash upper panel from damaging the air bag unit and interfering with a proper operation of the air bag unit during the collision, the air bag unit thereby being unaffected by movement of said dash upper panel during said collision.

* * * * *